Patented June 27, 1950

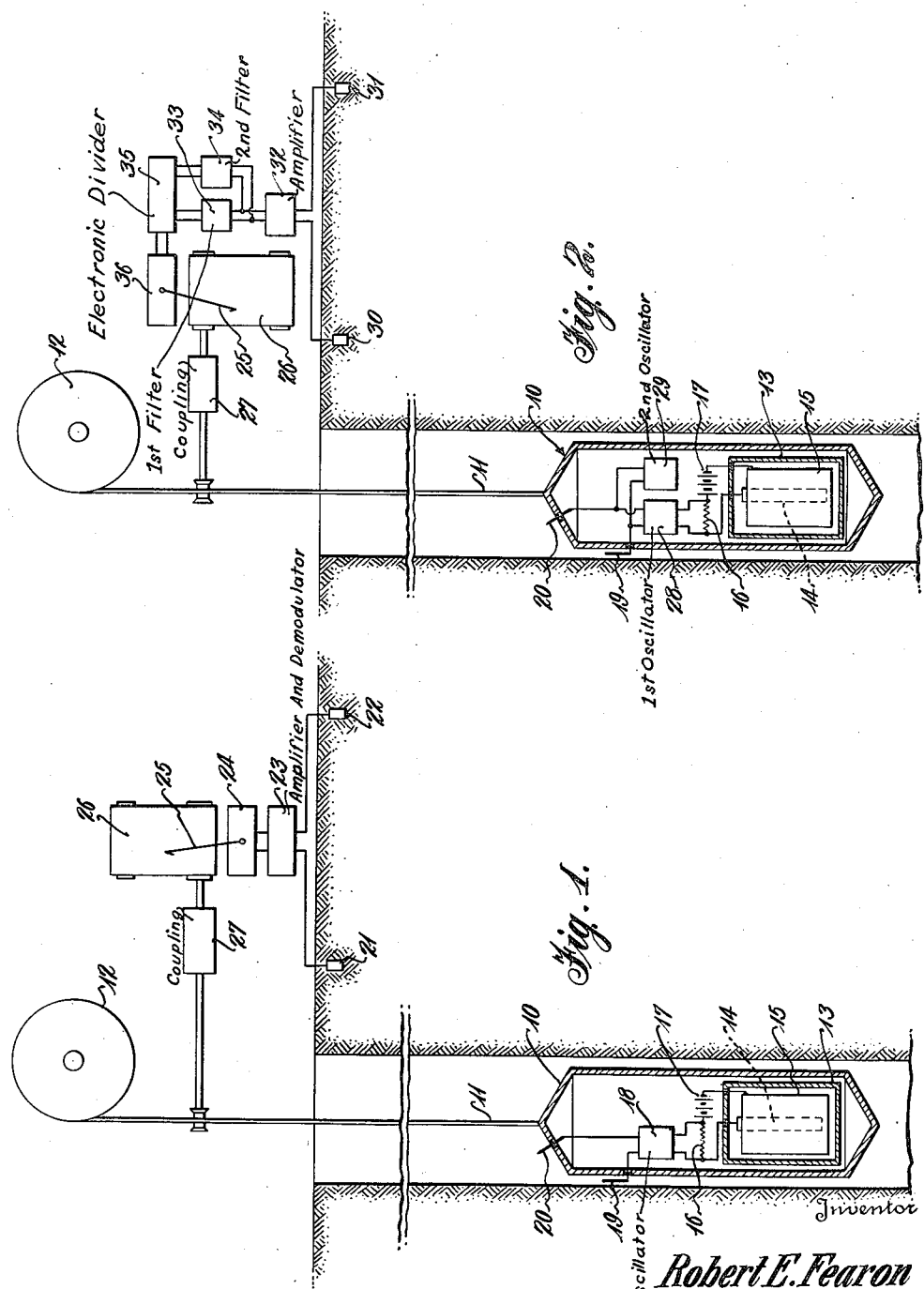

2,513,086

UNITED STATES PATENT OFFICE 2,513,086

WELL SURVEY METHOD AND APPARATUS

Robert Earl Fearon, Tulsa, Okla., assignor to Well Surveys, Incorporated, Tulsa, Okla., a corporation of Delaware Application December 27, 1939, Serial No. 311,218

5 Claims. (Cl. 250—83.6)

This invention relates to the art of geophysical prospecting anad more particularly to the making of observations in deep narrow bore holes and the like and the recording of these observations by surface equipment. Especially is this invention directed to a method and means for transmitting the observations from points deep within the bore hole to a recorder located on the surface of the earth, without the use of long, multiple conductor, insulated cables.

It is not new to make measurements in a bore hole or similar opening in the earth and to record these measurements by means of a recorder located on the surface. Measurements of resistance have long been made in this manner and it more recently has been suggested to measure the thermal, acoustic, magnetic, and radioactive properties of strata adjacent drill holes in this same general manner.

In every instance in which measurements were made in drill holes, however, it has either been necessary to lower a recorder into the drill hole with the measuring instrument or to have an insulated multi-conductor cable extending from the instrument in the hole to a recorder located on the surface. In either case great difficulties arise. If an attempt is made to lower the recorder into the hole with the instrument, it is necessary to construct a recorder small enough to be lowered into the hole and to find some means to drive the recorder and correlate the record of observations with a record of the depth at which the observations are made. This is all very difficult to accomplish.

On the other hand, if the recorder is located on the surface, it may be rather easily arranged to be driven from the drum that lowers the cable supporting the measuring instrument and thus to correlate the observations with depth. However, in such a case it has heretofore been necessary to have a plurality of insulated electrical conductors extending from the instrument in the well to the recording device on the surface and this is a much more serious problem than it would at first appear.

Practically all drill holes in which it is desired to make measurements are quite deep and are filled with mud, water, oil or mixtures thereof. Especially at lower levels these liquids are under tremendous pressures and they tend to force dissolved or pressure liquefied gases and the like into the insulation, which insulation then practically explodes when it is brought back to the surface. The liquids also tend to penetrate the insulation and thus destroy it. Still further the insulation is subjected to a great amount of mechanical wear in being lowered into and removed from the hole. Since great lengths of the cable are necessary and the cable must be unusually well constructed to withstand the hardships it must undergo, the expense of the cable used for this purpose is very great.

According to the present invention all of the difficulties which have heretofore been experienced with insulated cables are avoided by avoiding the use of an insulated cable and yet the recorder is still maintained on the surface so that the difficulties involved in lowering the recorder into the hole are also avoided.

This highly desirable result is accomplished by making of the measuring instrument a self-contained unit capable not only of making the measurements desired but also of emitting to the surrounding earth an electrical carrier wave upon which is modulated a signal indicative of the measurements being made. This instrument is suspended at the end of an ordinary uninsulated cable and a recording instrument is positioned on the surface and arranged so as to pick up the carrier waves from the ground, isolate the signal therefrom and make a recording in accordance therewith.

Various forms of the device may be constructed within the scope of this invention and the device may be used for making any type of measurements in the well. In its preferred form, however, it is used for measuring the radioactivity of the geological formations surrounding a well bore.

For this purpose a container or capsule is lowered into the well and this container or capsule contains an ionization chamber or Geiger-Müller counter, the internal resistance of which is affected by the intensity of any radioactive radiations impinging upon it. A battery and resistance are connected in series across this chamber and the voltage drop across the resistance is taken as a measure of the current flow through the chamber. This voltage drop is then used in combination with a current or currents of set frequencies to form current waves which are transmitted through electrodes extending outside the capsule, to the earth. In using the voltage drop in combination with a single set frequency current, the voltage drop may, for example, be used to modulate the frequency of the single set frequency current. If two set frequency currents are used the voltage drop may be used to modulate the amplitude of one of the currents which may then be combined with the current which has another frequency and a set amplitude.

In the first case, when the single carrier wave having a modulated frequency arrives at the surface it may be amplified by an automatic volume control amplifier to a fixed volume and then demodulated so as to obtain a wave with a frequency proportional to the modulating current. The frequency of this wave may then be recorded as an indication of the intensity of the modulating current and hence of the intensity of the radiations in the well. In correlation with this recording there will ordinarily be recorded an indication of the depth at which the capsule is operating. This may be accomplished by driving the recorder in accordance with the movements of the drum that lowers the cable supporting the capsule.

In the case of the transmission of two set frequency currents, one of which is amplitude modulated in accordance with the observation in the well, both currents may be linearly amplified upon arrival at the surface and the currents thereafter separated by filters and applied to an electrical dividing circuit which divides the amplitude of one of the currents by the amplitude of the other, and the output recorded in correlation with an indication of the depth at which the observation was made, as before. By reason of the fact that one of the currents is at fixed amplitude when it leaves the capsule and the attenuation of the currents is very nearly the same unless their frequencies are widely different, the division gives a value for the signal carrying current in terms of a proportion of a fixed or known amount regardless of the amount of attenuation suffered in the transmission. An electrical dividing circuit is described in Patent 2,129,880 issued to Serge Alexander Scherbatskoy and Jacob Neufeld on September 13, 1938.

To provide a better understanding of the details and the numerous advantages of the method and devices that have been mentioned a detailed description is hereafter given of two forms that the device may take. In these forms the devices are used for measuring the radioactivity of the surrounding strata and the electrical waves are sent out from the capsule through two electrodes insulated from the capsule and the supporting cable. It is to be understood, however, that, although this is the preferred form of the device, it is not necessary that the device be used only to measure radioactivity or that both of the electrodes transmitting the signals be entirely insulated from the capsule and cable. In fact, one of the electrodes may be directly connected to the capsule and cable, or the capsule and cable may be insulated from each other and one of the electrodes may be connected to the cable and the other to the capsule. As a further alternative the cable and capsule may be insulated from each other and one of the electrodes may be independent of both and the other may be connected to either one. Similarly, the recorder may have one of its receiving electrodes connected to the lifting cable or may have both electrodes connected to the ground.

In the drawings:

Figure 1 illustrates schematically what is perhaps the simplest form of the device; and Figure 2 illustrates a modification that is somewhat more complex but avoids the necessity of frequency modulation, demodulation and recording.

As shown in Figure 1 a capsule or chamber 10 is lowered into a drill hole by means of a plain uninsulated cable 11 suspended from a drum or reel 12 driven by means not shown. Within the capsule 10 is an ionization chamber 13 containing a central electrode 14 and an outer electrode 15. Across these electrodes are connected in series a resistor 16 and a battery 17. Across the resistor 16 is connected an electrical oscillator 18 in such a manner that its frequency is controlled by the voltage developed across the resistance. To this oscillator are connected a pair of electrodes 19 and 20 which extend through the cell of the chamber or capsule 10 and are insulated therefrom. Obviously, electrodes 19 and 20 must be tightly packed where they pass through the capsule in order to prevent leakage under the high pressures that will be encountered.

At the surface the waves sent out by the electrodes 19 and 20 are received by a pair of electrodes 21 and 22 and conveyed to an automatically volume controlled amplifier and demodulator 23 and from there to frequency meter 24 which operates the pen 25 of a recorder 26 thus recording on the record strip the changes caused by the difference in potential across the resistor 16. The recorder 26 is driven from the cable 11 through a mechanical connection 27 in such a manner that the movement of the recorder strip is proportional to the movement of the capsule up and down in the well. Thus the recorder correlates the position of the capsule in the well with the measurement being made.

To adapt this method and device to the making of other measurements in the well it is only necessary to change the type of measuring instrument in the well and to arrange the instrument so that it will give results in terms of differences in potential which can be applied to an oscillator or carrier wave generator so as to change its frequency.

The modified form of this invention shown in Figure 2 is similar to that shown in Figure 1 in that the measuring device consists of a capsule 10 supported on a plain, uninsulated cable 11 from a drum 12 and contains an ionization chamber 13 including a pair of electrodes 14 and 15 across which are connected a resistor 16 and a battery 17.

Again as in Figure 1 the voltage drop across the resistor is used as a measure of the observation being made but in the device shown in Figure 2 this potential is used not to modulate the frequency but to modulate the amplitude of a carrier wave which is generated by a generator 28. Also within the capsule 10 is a generator 29 which generates oscillations of another frequency and of a constant amplitude.

The outputs of the two generators are combined and imparted to the surrounding earth through electrodes 19 and 20 as is the output of the oscillator in Figure 1. Here, however, we have only two frequencies being transmitted, namely the frequencies of the two carrier waves. However, the amplitude of one of the carrier waves is constant and the amplitude of the other carrier wave varies in accordance with the observation. At the surface the waves are received through electrodes 30 and 31 and amplified linearly by an amplifier 32. The two frequencies then separated by filters 33 and 34 and passed to an electronic divider 35 which divides the amplitude of one of the waves by the amplitude of the other. Of course when the waves arrive at the surface they do not have the same amplitudes that they had when they left the measuring instrument but the attenuation of the two waves is practically the same unless their frequencies are greatly different. Thus, since one of the waves is at a standard or constant amplitude it serves as a standard with which the other wave can be compared by the process of division. The result is a quotient which will be constant so long as the output of the oscillator 28 is constant but whenever this output is varied by a variation in the voltage drop across the resistor 16 then the quotient will vary accordingly. The quotient is thus a measure of the voltage drop across this resistance and hence of the intensity of the radiations impinging on the ionization chamber.

From the electronic divider 35 the current representing the quotient of the two currents which were divided one into the other is taken to an ammeter 36 which operates a pen 25 of a recorder 26 driven as in Figure 1 through a mechanical or electrical connection 27 from the cable 11. Since it is not always convenient to have the recorder located closely adjacent the cable 11 an electrical transmission system such as a "Selsyn" transmission system has been found desirable in place of the mechanical system shown.

The detailed circuits of the various elements used in the process and devices above have not been specifically described inasmuch as they are commonly known and may be varied within relatively wide ranges without departing from the principles of this invention.

I claim:

1. In a device for geophysical exploration which includes a measuring instrument adapted to be lowered into a drill hole to measure phenomena indicative of the character of the surrounding strata and a recorder on the surface for recording said measurements, the improvement that comprises, as means to connect the measuring instrument and the recorder, a means at the measuring instrument to generate oscillations, means to modulate the amplitude of said oscillations in accordance with the magnitude of the measurement being made, means to generate oscillations of a frequency different from the first mentioned oscillations and of a constant amplitude, means to impress both of said oscillations upon the surrounding earth at the measuring instrument, means at the surface of the earth to detect both of said oscillations, means to divide the amplitude of one of said detected oscillations by the amplitude of the other and means to operate a recorder in accordance with the quotient so obtained.

2. In a device for geophysical exploration which includes a measuring instrument adapted to be lowered into a drill hole to measure phenomena indicative of the character of the surrounding strata and a recorder on the surface for recording said measurements, the improvement that comprises, as means to connect the measuring instrument and the recorder, a means at the measuring instrument to generate oscillations, means to modulate the amplitude of said oscillations in accordance with the magnitude of the measurement being made, means to generate oscillations of a frequency different from the first mentioned oscillations and of a constant amplitude, means to impress both of said oscillations upon the surrounding earth at the measuring instrument, means at the surface of the earth to detect both of said oscillations, means to divide the amplitude of one of said detected oscillations by the amplitude of the other, means to operate a recorder in accordance with the quotient so obtained and means to record the depth at which the measurement is being taken in correlation with the record of the measurement.

3. In a device for geophysical exploration which includes a measuring instrument adapted to be lowered into a drill hole to measure phenomena indicative of the character of the surrounding strata and a recorder on the surface for recording said measurements, the improvement that comprises, as means to connect the measuring instrument and the recorder, a means at the measuring instrument to generate oscillations, means to modulate the amplitude of said oscillations in accordance with the magnitude of the measurement being made, means to generate oscillations of a frequency different from the first mentioned oscillations and of a constant amplitude, means to impress both of said oscillations upon the surrounding earth at the measuring instrument, means at the surface of the earth to detect both of said oscillations, means to divide the amplitude of one of said detected oscillations by the amplitude of the other, means to operate a recorder in accordance with the quotient so obtained and means operated from a cable that supports the measuring instrument in the hole, to record the depth at which the measurement is being made in correlation with the record of the measurement.

4. In a device for geophysical exploration which includes a measuring instrument adapted to be lowered into a drill hole to measure phenomena indicative of the character of the surrounding strata and a recorder on the surface for recording said measurements, the improvement that comprises, as means to connect the measuring instrument and the recorder, a means at the measuring instrument to generate electrical oscillations, means to modulate the amplitude of said ocsillations in accordance with the magnitude of the measurement being made, means to generate a second group of oscillations of constant magnitude, means to impress all of said oscillations upon the surrouinding earth at the measuring instrument, and means at the surface of the earth to detect both sets of oscillations, means to divide the amplitude of one set of oscillations by the amplitude of the other and means to operate a recorder in accordance with the quotient so obtained.

5. In a device of the kind described and claimed in claim 4 means to drive the recorder in accordance with the movement of the cable used to support the measuring instrument in the drill hole so as to correlate the depth at which the measurements are taken with the record of the measurement.

ROBERT EARL FEARON.

REFERENCES CITED

The following references are of record in the file of this patent:

UNITED STATES PATENTS

| Number | Name | Date |
|---|---|---|
| 1,808,709 | Blake | June 2, 1931 |
| 1,996,530 | Sundberg | Apr. 2, 1935 |
| 2,018,080 | Martienssen | Oct. 22, 1935 |
| 2,133,776 | Bender | Oct 18, 1938 |
| 2,225,668 | Subkow et al. | Dec. 24, 1940 |

OTHER REFERENCES

"Geophysics," vol. IV, Mar. 1939 (pages 108–110).